United States Patent [19]

Razavi

[11] 3,990,841
[45] Nov. 9, 1976

[54] SULFINIC ACID AND THIOUREA DYEING OF CELLULOSIC TEXTILES

[75] Inventor: Djavad Razavi, Paris, France

[73] Assignee: Produits Chimiques Ugine Kuhlmann, Paris, France

[22] Filed: Oct. 5, 1965

[21] Appl. No.: 493,247

[30] Foreign Application Priority Data

Oct. 6, 1964 France .................. 64.990479

[52] U.S. Cl. .......................... 8/54.2; 8/37
[51] Int. Cl.² ................. D06P 1/30; D06P 3/60
[58] Field of Search ........... 8/37, 1.213, 54, 54.2, 8/39, 41

[56] References Cited
UNITED STATES PATENTS

| | | | |
|---|---|---|---|
| 2,670,265 | 2/1954 | Heyna et al. ............... | 8/1 X |
| 2,832,789 | 4/1958 | Zerweck et al. ............ | 8/37 |
| 3,053,850 | 9/1962 | Clark et al. ................ | 260/314.5 |
| 3,547,957 | 12/1970 | Razavi ..................... | 260/374 |

FOREIGN PATENTS OR APPLICATIONS 1,413,126  8/1965  France .................. 8/1 XA
6,413,327  11/1964  Netherlands ............ 8/1.213

OTHER PUBLICATIONS

Alexander et al, "Wool, Its Chemistry and Physics", p. 1964.

Luttringhaus, *American Dyestuff Reporter*, pp. 73–75 Aug. 31, 1964 8/1.213 Lubs, The Chemistry of Synthetic Dyes and Pigments, pp. 302–305 Pub. by Reinhold Pub. Corp., NYC, 1955, TP 918 L8.%

Lubs, The Chemistry of Synthetic Dyes and Pigments, pp. 302–305, Pub. by Reinhold Pub. Corp., NYC, 1955.

*Primary Examiner*—Donald Levy
*Attorney, Agent, or Firm*—Beveridge, DeGrandi, Kline & Lunsford

[57] ABSTRACT

Process for the coloration of cellulosic textile fibers which comprises applying thereto, in the presence of thiourea, a dyestuff containing in its molecule at least one sulphinic group, and fixing the dyetuff by means of a treatment at a temperature ranging from 100° C to 200° C.

7 Claims, No Drawings

SULFINIC ACID AND THIOUREA DYEING OF CELLULOSIC TEXTILES

The present invention is concerned with a process for the coloration of textile fibres and with materials dyed or printed by means of the process.

It has been found that dyestuffs containing in their molecule at least one sulphinic group as the free acid —$SO_2H$ or as a salt thereof are capable of being fixed on textiles fibres, especially on wool, silk, natural or regenerated cellulose fibres or polyamide fibres, by treatment at elevated temperature. According to the present invention a process for the coloration of textile fibres is provided which comprises applying to the fibres a dyestuff containing in its molecule at least one sulphinic group and fixing the dyestuff by means of treatment at an elevated temperature.

It is preferred, especially in the case of cellulose fibres, to carry out this treatment in the presence of sulphur or a substance capable of yielding sulphur, such as thiourea, a derivative of thiourea, for example an alkylthiourea or arylthiourea, a thioamide, thiocyanate, an alkali metal sulphide, alkali metal thiosulphate, or in the presence of finely divided elementary sulphur.

Amongst the dyestuffs which can be used in the process of the invention are, for example, the following: azo, anthraquinone, oxazine, nitro, phthalocyanine, perinone, naphthoyleneimidazole, perylene tetracarbonimide and quinacridone dyestuffs. They may be metallisable or metalliferous and may contain metals such as copper, chromium, cobalt, nickel, manganese or iron. Besides the sulphinic group, they may contain other water-solubilising substituents such as for example —$SO_3H$, —COOH, —$s_2O_3Na$, or —$OSO_3H$ groups, or reactive groups such as vinylsulphone, β-chloroethylsulphonamido, β-chloro-β-hydroxy-propylsulphonamido, 2,6-dichloro-1,3,5-triazine-yl, 2-chloro-1,3,5-triazine-yl, 2,4-dichloro-pyrimidinyl, 2,4,5-trichloro-pyrimidinyl, 2-chloro-benzothiazyl, 1,4-dichloro-phthalazinyl or 2,3-dichloro-quinoxalinyl groups.

The sulphinic group may be introduced into the molecule of the dyestuff or one of its intermediate products for example by one of the general known methods for the preparation of sulphinic acids, such as by the action of a reducing agent on a sulphochloride or by the action of sulphurous acid on a diazonium salt in the presence of copper powder. The conversion of the —$SO_2Cl$ group into a sulphinic acid group by means of a reducing agent can be effected, for example, by the action of an aqueous solution of alkali metal sulphite at a temperature between 0° C. and 50° C., under conditions such that there is always a small excess of alkali metal sulphite in the solution.

The introduction of the sulphochloride group itself can be effected for example by the usual methods, such as oxidation by chlorine of a disulphide group, sulphochlorination by chlorosulphonic acid, the conversion of a sulphonic group into a sulphochloride group by the action of chlorosulphonic acid, thionyl chloride, phosphorus pentachloride, phosphorus trichloride and chlorine, or phosphorus oxychloride. This introduction may be carried out on the dyestuff itself or on an intermediate product such as, for example, a coupling compound, which is subsequently converted into dyestuff.

The dyestuffs thus obtained are stable at ordinary room temperature in a slightly acid (i.e. having a Ph between 4 to 7), neutral or alkaline aqueous medium, which enables them to be dried as the free acids or as salts and their alkaline solutions to be kept without deterioration. They may be applied to the fibres for example by dyeing, foularding or printing. For this purpose, the aqueous solutions of these dyestuffs, possibly thickened, and to which may be added sulphur or products yielding sulphur, solvents, hydrotropes, wetting agents, dispersing agents, stabilisers, acid-abosrbing agents or other auxiliary substances, are applied to the fibres according to the usual processes. These fibres may be of any form, such as for example yarn, fabric, wadding, bobbins, or cakes. The fixation of the dyestuff on the fibre is advantageously effected by a thermal treatment at elevated temperature, for example by heating the dyebath to the boil in the case of wood or "nylon." In cases where the application in aqueous medium has not been carried out at a temperature sufficient to ensure the fixing of the dyestuff on the fibre, the material for example cotton is subjected to a subsequent thermal treatment at a temperature ranging from 100° C. to 220° C. Under these conditions the dyestuff is fixed on the fibre with a high yield, which is in most cases nearly quantitative, and thus provides colorations which show an excellent fastness to wet tests.

The following examples, in which the parts are parts by weight, unless the contrary is indicated, are given without limiting the invention thereto.

EXAMPLE 1

12 parts of copper phthalocyanine are added to 60 parts by volume of chlorosulphonic acid with external cooling, and the mixture is then heated to 135° C. over a period of half an hour and maintained for 4 hours at 135°–142° C: It is then cooled to 60° C., 20 parts by volume of thionyl chloride are added, and the mixture is heated to 95° C. over a period of half an hour and maintained for an hour and a half at 95°–98° C. It is cooled, poured into 250 parts of a saturated solution of salt containing 500 parts of ice, filtered and the filter cake washed with ice water. The cake is suspended in 200 parts of ice water, the pH adjusted to neutrality at 0° C. by means of a 2N solution of sodium carbonate, 20 parts of anhydrous sodium sulphite are added, and the whole is stirred for about two hours at the ambient temperature, while the pH is kept slightly alkaline at between 7.3 and 7.8 by means of a 5N caustic soda solution. 100 parts of salt are added, the product is acidified with 15 parts of concentrated hydrochloric acid until the pH is 3, and the solid is filtered off, washed with a saturated solution of salt and dried at 50° C. A deep blue powder is obtained. On dyeing in the presence of acid-absorbing agents and urea and heat-fixing, this dyestuff gives, on natural or regenerated cellulose fibres, a green shade which is very fast to wet tests. The fastness to washing may be further improved by adding thiourea to the foularding solution or to the printing paste of the dyestuff.

The application is made, for example, in the following manner: a foularding bath is prepared containing one part of dyestuff, 5 parts of urea, 1.5 to 2 parts of thiourea, 0.6 parts of sodium carbonate, and 20 parts of water. A cotton fabric is foularded in the bath so prepared, and is dried at 80° C. and fixed for about 3 minutes at 200° C. After washing and soaping, a very brilliant green shade is obtained having excellent fastness to wet tests and to light.

EXAMPLE 2

25 parts of bis-1,4-(2',6'-dimethyl-phenylamino)-anthraquinone are added to 90 parts by volume of chlorosulphonic acid, and the mixture is heated slowly to 70°–80° C. and this temperature is maintained until evolution of hydrochloric acid ceases, which requires about two hours. 20 parts by volume of thionyl chloride are added in a period of 20 minutes, and the mixture is heated to 98° C. and maintained at this temperature for two and a half hours, after which it is cooled, poured on to ice, the solid filtered off and washed with ice water. The filter cake obtained is suspended in ice water and 40 parts of sodium sulphite are added at pH 7.6. The mixture is heated to 45°–50° C. in an hour and a half and maintained at this temperature for about 2 hours while the pH is regulated to about 7.5 by means of a 2N solution of caustic soda until there is no longer any tendency for it to fall. 200 parts of salt are added, and the solid is filtered off in the hot, washed with a 15% solution of salt and dried at 50° C. A deep blue powder is obtained which dyes cotton by the process described in Example 1 in a very bright blue shade having an excellent fastness to wet tests and to light.

EXAMPLE 3

The sulphochloride of bis-1,4-(4'-methyl-phenylamino)anthraquinone is prepared and treated with a solution of sodium sulphite according to the process of Example 2. A dyestuff which dyes cellulose fabrics green is obtained.

EXAMPLE 4

50 parts of [2-hydroxy-naphthalene] <1 azo 7 >1,5-disulphonaphthalene are added to 250 parts of chlorosulphonic acid while cooling externally, then the mixture is slowly heated to 70° C. and maintained at this temperature for 3 hours. It is cooled to 60° C. and 30 parts by volume of thionyl chloride are added, and the mixture is then heated to 70°–75° C. and maintained at this temperature for two hours. It is cooled to the ordinary temperature, poured on to ice, and the solid is filtered off and washed with ice water. The filter cake obtained is then suspended in 300 parts of water and ice, the pH is adjusted to neutrality, and 50 parts of sodium sulphite are added. The mixture is allowed to attain the ambient temperature while the pH is regulated to around 7.5 by means of a 2N solution of caustic soda. Then 400 parts of salt are added and the product is acidified with 50 parts of concentrated hydrochloric acid. After filtration of the solid and washing with saturated brine, it is dried at 50° C. A deep red powder is obtained which dyes cellulose by the process of Example 1 in a red shade which is very fast to wet tests. This dyestuff also dyes wool at the boil in acid, neutral or slightly alkaline medium in a red shade, likewise very fast to wet tests. It dyes "Nylon" in an aqueous bath at the boil.

EXAMPLE 5

50 parts of [1-phenyl-3-methyl-5-pyrazolone]-<4 azo 7>-[1,5-disulphonaphthalene] are added to 150 parts of chlorosulphonic acid with external cooling, and the mixture is heated slowly to 70°–80° C. and maintained at this temperature for 2½ hours. 45 parts by volume of thionyl chloride are gradually added, and it is then heated at 95–98° C. for 2½ hours, cooled to the ambient temperature, poured on to ice, the solid filtered off and washed with ice water. The filter cake obtained is suspended in 300 parts of water at 0° C. and the pH is adjusted to neutrality by means of a 2N solution of sodium carbonate. 40 parts of sodium sulphite are added and the mixture is left to attain the ambient temperature while the pH is regulated to around 7.5 by means of a 2N solution of sodium carbonate. 200 parts of salt are added and the product is acidified with 50 parts of concentrated hydrochloric acid, the solid filtered off, washed with saturated brine and dried at 50° C. A yellow powder is obtained which dyes cellulose fabrics by the process of Example 1 a bright yellow shade possessing an excellent fastness to washing.

EXAMPLE 6

20 parts of di-(1-anthraquinonyl)-amine are added to 100 parts of chlorosulphonic acid while cooling externally. The mixture is heated slowly to 75° C. and maintained for 4 hours at 75°–80° C. 20 parts by volume of thionyl chloride are added in a period of 45 minutes, and the mixture is heated to 95–98° C. and maintained at this temperature for two and a half hours. It is then left to cool to the ambient temperature, poured into ice and filtered. The filter cake thus obtained is suspended in 500 parts of ice water, the pH is adjusted to neutrality, and 20 parts of sodium sulphite are added. The mixture is then heated to 45° C. in a period of two hours while maintaining the pH slightly alkaline (i.e. about 8), stirred for an hour at this temperature, acidified with hydrochloric acid, salted out with sodium chloride, the solid filtered off, washed with brine and dried at 50°C. A deep brown powder is obtained which dyes cotton by the process of Example 1 in a brown shade which is very fast to wet tests and to light.

EXAMPLE 7

On operating as in Example 5 with 50 parts of [4'-sulpho1-phenyl-3-methyl-5-pyrazolone]- <4 azo 1>- (4-sulphobenzene), a dyestuff is obtained which, under the same conditions of application, dyes cellulose fabrics a golden yellow shade which is very fast to washing.

EXAMPLE 8

15 parts of the dioxazine dyestuff of the formula

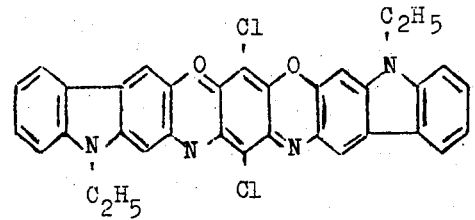

are introduced into 100 parts by volume of chlorosulphonic acid with external cooling, and the mixture is heated in a period of 1 hour up to 115–120° C. and maintained at this temperature for 4½ hours. It is cooled to 50°–60° C., 45 parts of thionyl chloride are added, and the mixture is heated up to 95° C. and maintained at this temperature for 3 hours. After cooling, it is poured in to 1000 parts of water and ice, filtered, and the filter cake thus obtained washed with ice water. It is suspended in 250 parts of water and ice and 30 parts of sodium sulphite are added while stirring. The pH is maintained at between 8 and 8.2 by the addition of a 2N solution of sodium carbonate at 0° C. After solution of the dyestuff, it is heated for 1 hour at 45°–50° C., cooled to 10° C. and the sulphinic dyestuff is precipitated by means of hydrochloric acid and sodium chloride, and is filtered off, washed with brine and dried at 50° C.

8 parts of urea and 2 parts of thiourea are added to a solution of the dyestuff obtained comprising one part of dyestuff as sulphinate in 25 parts of water. A cellulose fabric is foularded with the solution thus prepared, dried at 80° C., heated for 3 to 5 minutes at a temperature of 180° C., washed with water and washed with soap at the boil. A violet-blue coloration is obtained which is endowed with very good fastness to washing and to light.

EXAMPLE 9

20 parts of induline base are introduced into 75 parts of chlorosulphonic acid with external cooling, and the mixture is heated up to 120°–130° C. in a period of one hour and maintained at this temperature for 4½ hours. It is cooled to 60°–70° C., 40 parts by volume of thionyl chloride are gradually added while heating slowly up to 95°–98° C. and this temperature is maintained for 3 hours and then the product is cooled to ordinary temperature. The solution thus obtained is poured in to 500 parts of water and ice. The precipitate formed is filtered off, washed with ice water and suspended in 200 parts of water and ice. 40 parts of sodium sulphite are added while stirring and maintaining the pH at between 8 and 8.4 by the addition of a 2N solution of sodium carbonate at a temperature of 0° C. The dyestuff is practically dissolved at this temperature. It is heated for an hour at 45°–50° C., cooled to 15° C., acidified with hydrochloric acid, the solid filtered off, washed with brine and dried at 50° C. A dyestuff is obtained which dyes cellulose fabric by the process of Example 1 in a black shade which is fast to wet tests and to light.

EXAMPLE 10

25 parts of phthaloperinone are introduced into 150 parts of chlorosulphonic acid, the mixture is heated to 80° C. and this temperature maintained for 1 hour. Then 30 parts by volume of thionyl chloride are gradually added and the mixture is heated for 2 hours at 90°–95° C.

It is left to cool, the mass is poured on ice, and the solid is filtered off and washed with ice water. The precipitate is made into a paste with 300 parts of ice water and neutralised to pH 7 by the addition of the necessary amount of sodium carbonate solution. 30 parts of anhydrous sodium sulphite are added in successive fractions at 0° C. then the temperature is allowed to rise to the ambient temperature while the pH is maintained at between 7 and 7.4 by the introduction of 250 parts by volume of a 2N solution of sodium carbonate.

After stirring for 2 hours, a little insoluble material is filtered off and the dyestuff is precipitated by the addition of 200 parts of sodium chloride and 27 parts of sodium chloride and 27 parts by volume of 10N hydrochloride acid.

The solid is filtered off, drained and dried under vacuum. 48.5 parts of a dyestuff are obtained which, when applied according to Example 1, dyes cellulose fibres a red-brown shade which is very fast to washing.

EXAMPLE 11

On operating as in Example 10 on 30 parts of naphthaloperinone, a dyestuff is obtained which, under the same conditions of application to cellulose fabric, provides a violet-brown shade having very good fastness to washing and to light.

I claim:

1. Process for the coloration of cellulosic textile fibres which comprises applying thereto, in the presence of thiourea, a dyestuff containing in its molecule at least one sulphinic group, and fixing the dyestuff by means of a treatment at a temperature ranging from 100° C to 220° C.

2. Process according to claim 1 wherein the sulphinic group is a sulphinic acid group.

3. Process according to claim 1 wherein the sulphinic group is a salt of sulphinic acid.

4. A process for coloring cotton textile fibers comprising the steps of applying to the fibers an aqueous composition comprising a water soluble, organic dyestuff which is a sulfinate of the phthalocyanine series selected from the group consisting of phthalocyanine sulfinates, copper phthalocyanine sulfinates and nickel phthalocyanine sulfinates and containing at least one pendant sulfinate group per phthalocyanine molecule as a substituent for hydrogen in the arylene nuclei of the phthalocyanines and a fixing agent selected from the group consisting of thiourea and elemental sulfur; drying the fibers; heating the fibers at an elevated temperature until the dyestuff is fixed; and washing the fibers.

5. A process as defined in claim 4, and further characterized in that said sulfinate of the phthalocyanine series also has pendant thiosulfinate or pendant sulfonate groups as substituents for hydrogen in the arylene nuclei of the phthalocyanines.

6. A process as defined in claim 4, and further characterized in that said aqueous composition is neutral or slightly alkaline.

7. A process as defined in claim 4 and further characterized in that said elevated temperature is 100°–220° C.

* * * * *